June 24, 1947.  J. A. FOTIE  2,422,829
MAT WELDING DEVICE
Filed April 2, 1945  4 Sheets-Sheet 1

INVENTOR.
Joseph A. Fotie
BY
ATTORNEY.

June 24, 1947.　　　J. A. FOTIE　　　2,422,829
MAT WELDING DEVICE
Filed April 2, 1945　　　4 Sheets-Sheet 4

INVENTOR.
Joseph A. Fotie
BY
ATTORNEY.

Patented June 24, 1947

2,422,829

UNITED STATES PATENT OFFICE 2,422,829

MAT WELDING DEVICE

Joseph A. Fotie, Kansas City, Mo.

Application April 2, 1945, Serial No. 586,097

5 Claims. (Cl. 219—4)

This invention relates to improvements in a mat welding device and refers more particularly to a welding apparatus through which a plurality of longitudinal wires are fed and intermittently thereon at spaced intervals single cross wires are deposited and welded simultaneously at a plurality of welding points where the longitudinal and cross wires intersect. The mat is advanced by a feeding device after each welding operation to position the wires properly for each successive welding operation. Subsequent to welding the mat is rolled upon a reel or spool in convenient form for handling. In the production of mats, fencing or other wire products, where the cross wires are welded to longitudinal wires, the welding operations have usually been performed by separate welds, however, when performed simultaneously difficulties have been encountered in producing a uniform weld at each intersection and in feeding the wires and welded mat evenly through the machine to avoid and eliminate the tendency for the mat to warp.

To avoid these difficulties, the present mat welding device was developed. The apparatus is particularly adapted for the manufacture of landing mats which have come into use during the second World War for landing operations to establish beach-heads where some sort of portable relatively rigid ground reinforcement is required for landing heavy equipment on the beaches and for use in temporary airplane landing strips.

An object, therefore, of the invention is to provide an apparatus in which the longitudinal wires fed thereto are preliminarily straightened prior to the welding operation.

Another object is to automatically deposit and simultaneously weld the individual cross wires onto the longitudinal wires in the production of a mat.

A further object of the invention is to provide a mat which is fed evenly and welded with precision, thereby eliminating the tendency of the mat to warp when subsequently rolled out for use.

Another object is to provide a mat welding device which automatically winds the mat after welding into easily handled rolls.

Other and further objects of the invention will appear from the following description.

Figure 1:
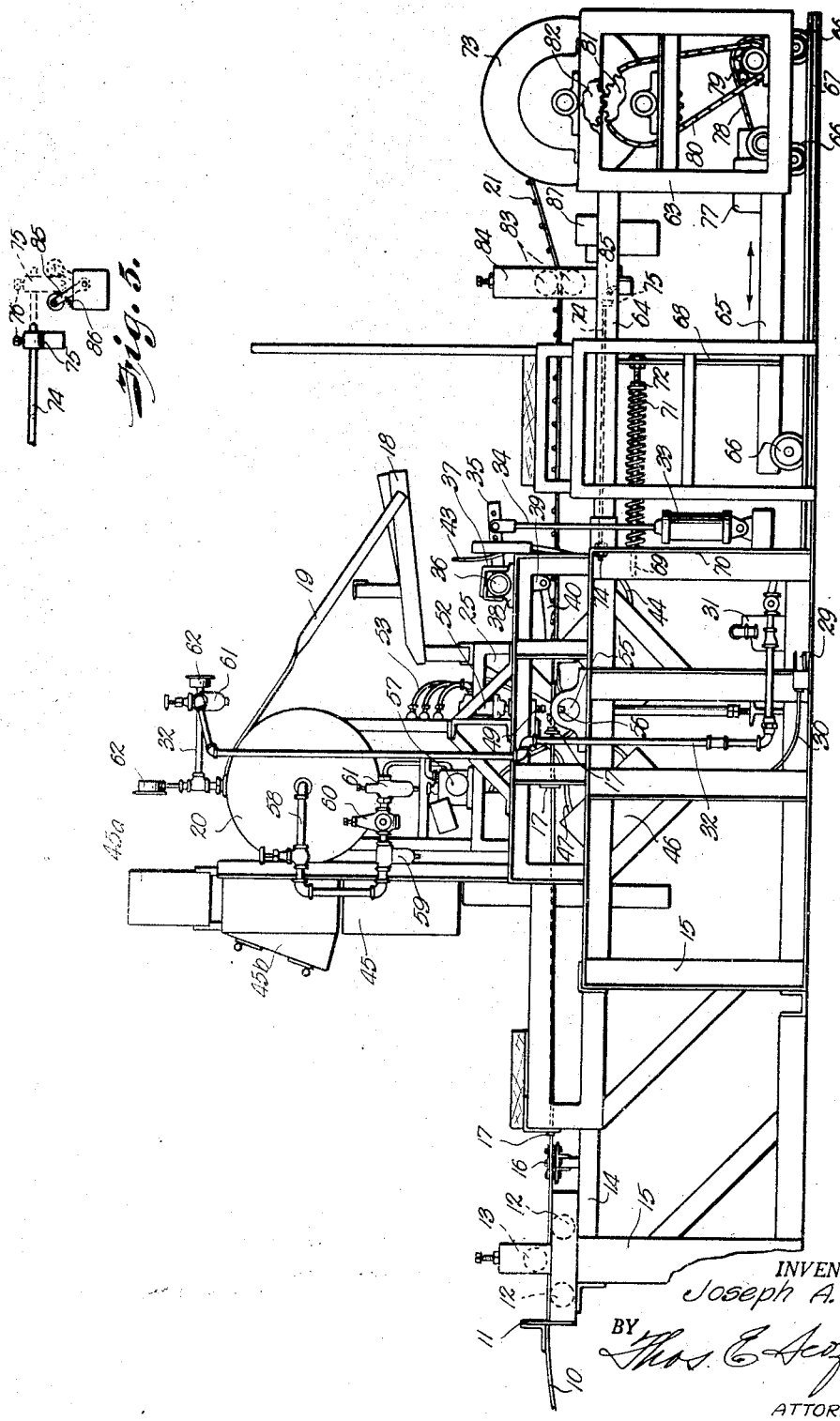
Figure 2:
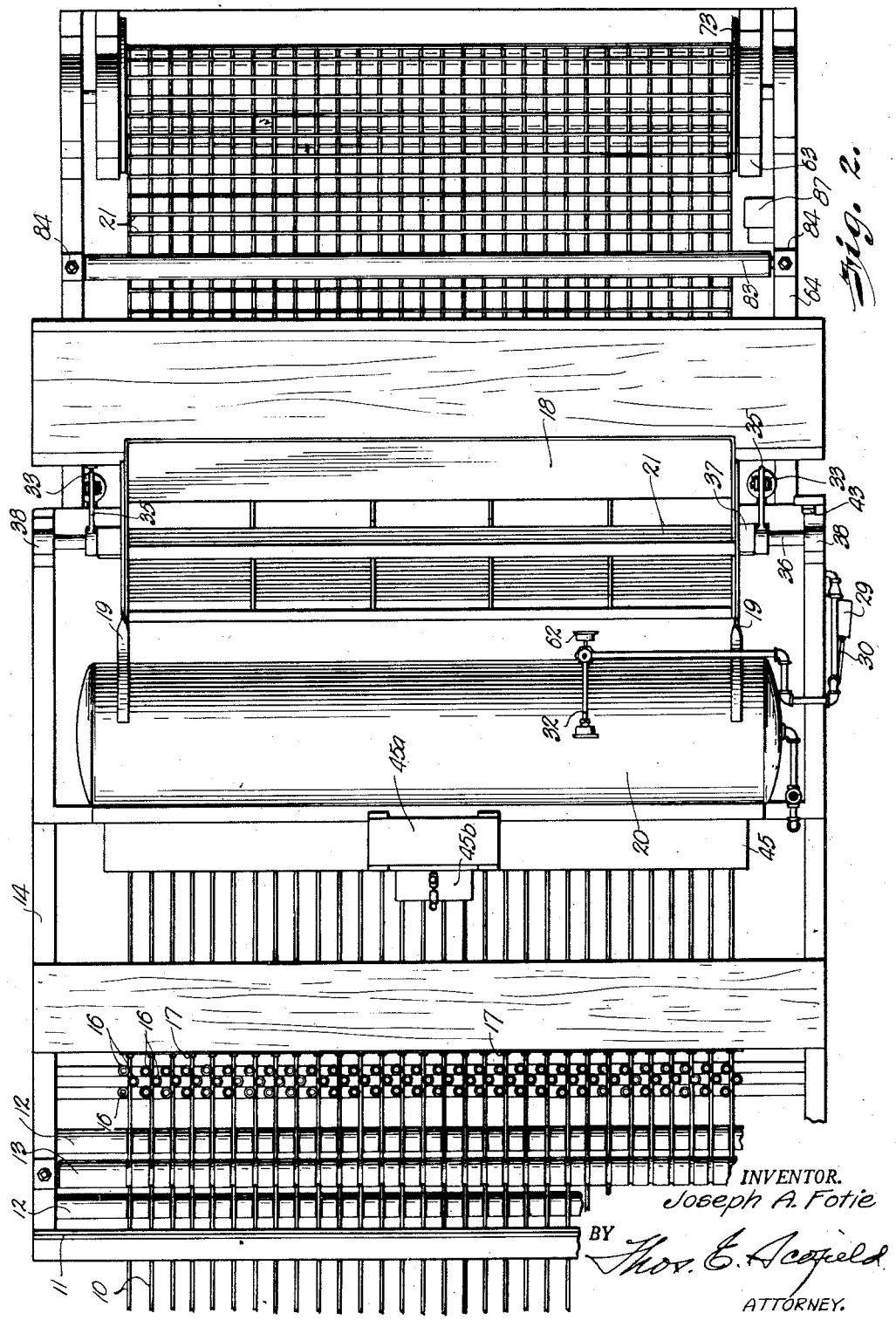
Figure 3:
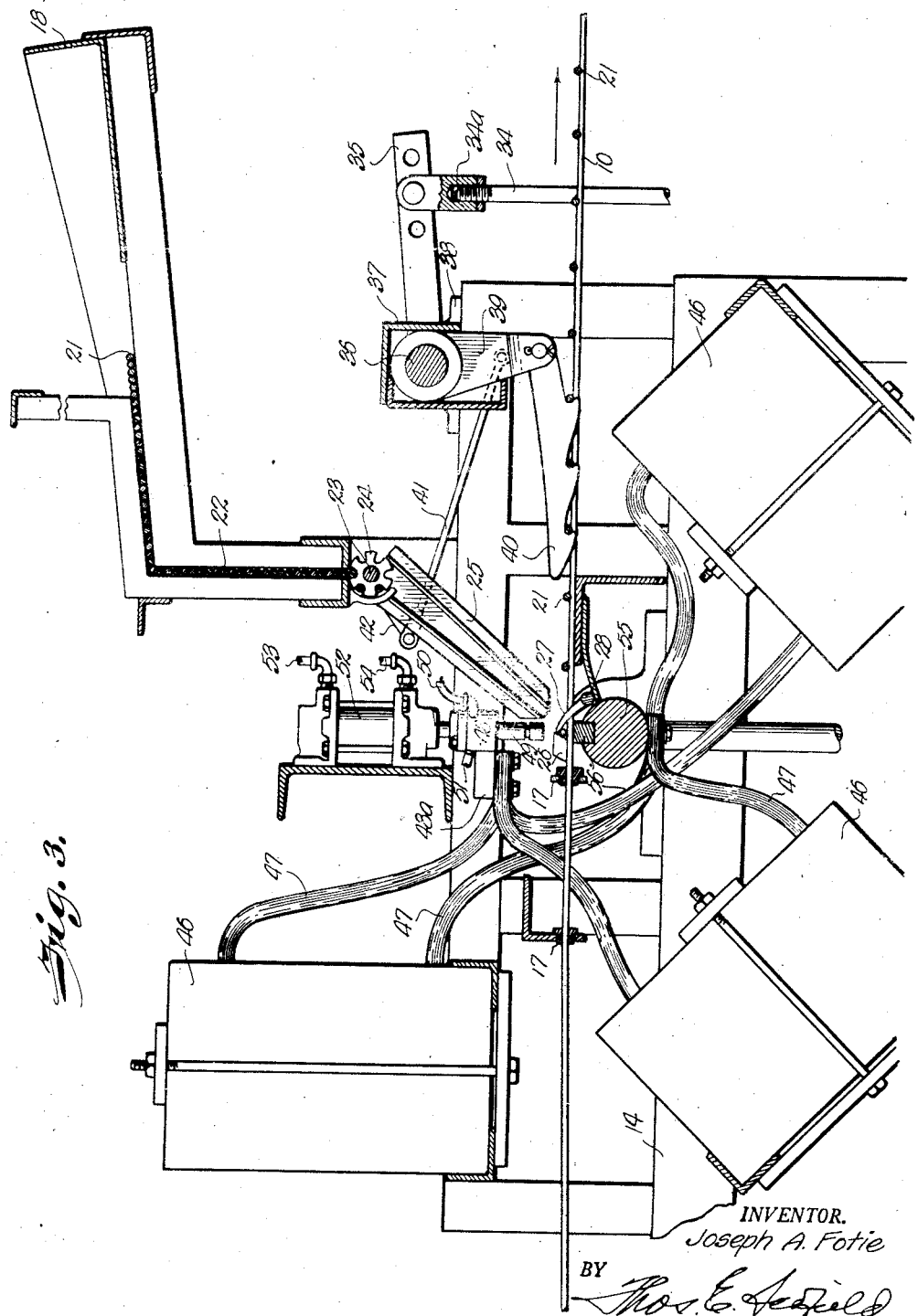
Figure 4:
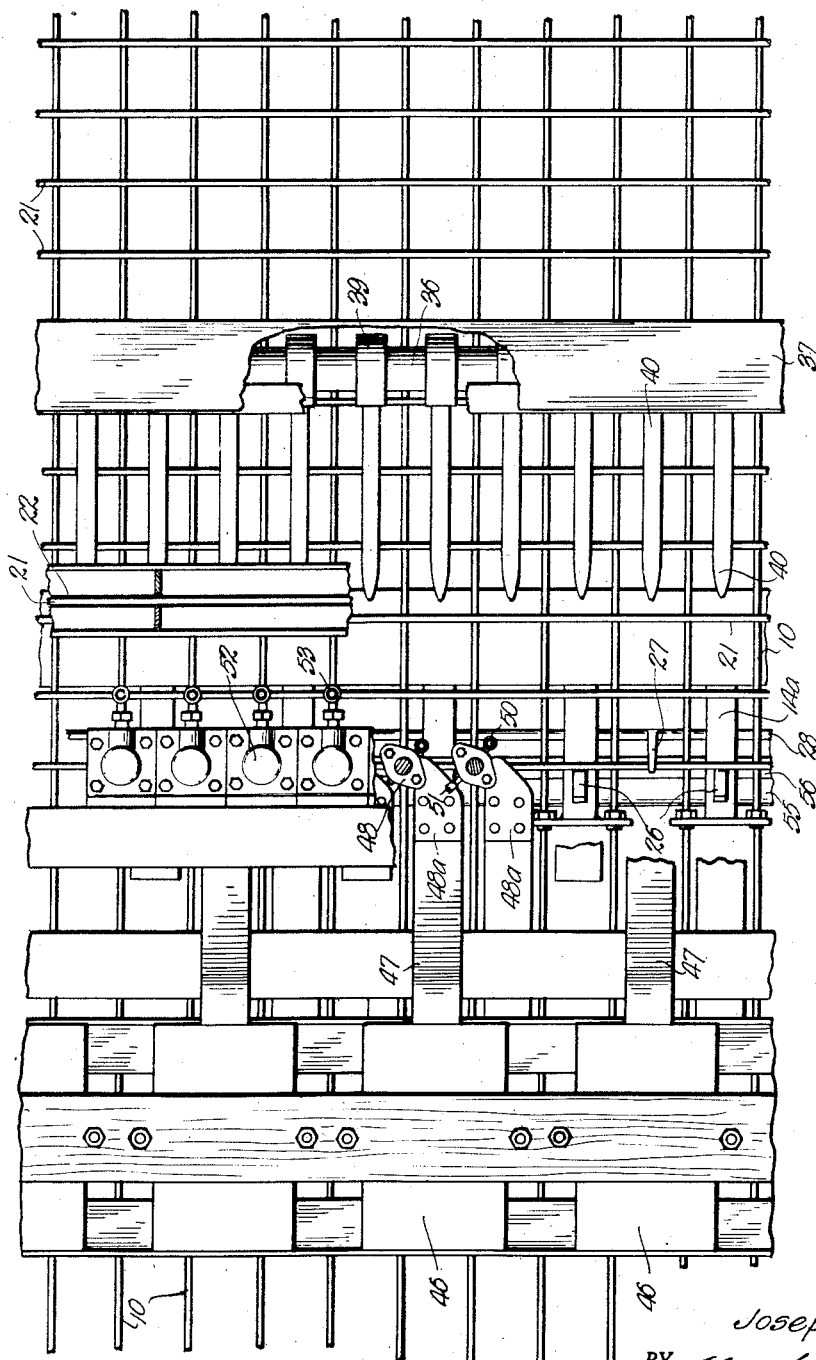

In the accompanying drawings which form a part of the instant specification and are to be read in conjunction therewith and in which like reference numerals are used to indicate like parts in the various views, Fig. 1 is a side elevational view of an apparatus embodying the invention, Fig. 2 is a plan view of the mechanism shown in Fig. 1, Fig. 3 is an enlarged detail of the welding mechanism, cross wire feed, and mat feeding oscillator, Fig. 4 is a plan view of the mechanism shown in Fig. 3 with parts broken away, and Fig. 5 is a detail of the motor-stopping switch which controls the movements of the mat roll carriage.

For convenience in describing the apparatus it will be divided into the following parts or sections:

I. Wire-straightening mechanism.
II. Cross wire feed.
III. The mat-advancing or feeding mechanism.
IV. Electrode actuation device.
V. Roll-making carriage and reel.

To facilitate an understanding of the description to follow, it is deemed advisable to first briefly explain the operation. Separate wires of any desired selected gauge of which the mat is to be made are fed from reels or rolls conveniently located near the machine. The wires should be fed with as fair a lead as possible and without abrupt change in direction to avoid bending or crimping the wires before entering the apparatus. As the wires enter the apparatus they are put through horizontal and vertical straightening rolls after which they are fed between the upper and lower welding electrodes. Above the point where the electrodes are located there is a cross wire feed which deposits transverse cross wires on top of the longitudinal wires at spaced intervals as the mat is advanced. These cross wires are automatically held in position and welded to the longitudinal wires at each of the intersections. The operator performs this welding operation and actuates the mat feeding mechanism by manually operated switches. The mat feeding switch causes hook-shaped gripping members to engage the welded cross wires and advance the mat a distance equal to the space between the cross wires. At the same time and through an automatically operated mechanism the welded mat which has been advanced by the feed is taken up on a storage roll where the mat is accumulated until a desired size roll is produced. The automatic take-up device which operates the storage roll mechanism keeps a constant strain or tension upon the mat as it is welded.

Wire straightening mechanism

In the production of a landing mat having 30 longitudinal wires, spaced apart at about 3 inch intervals and cross wires welded at 3 inch intervals, wires 10 are fed from reels or coils of wire, not shown, through a slotted plate or fence picket panel 11 which directs the wires individually to the machine. The wires then pass over two lower horizontal rolls 12 and beneath an upper roll 13 staggered vertically with reference to the lower rolls. Both the lower rolls 12 and the upper roll 13 are grooved, as shown in Fig. 2, to accommodate the individual wires and straighten the wires in one direction as the wires pass therethrough.

The rolls are mounted in suitable bearings which are supported by the frame 14 and vertical standards 15. Each wire is then fed between sets of three vertically positioned grooved rolls 16 also staggered, the wires fitting in the grooves of the rolls and are thereby straightened at right angles to the straightening operation of the horizontal rolls. After passing the second set of vertical rolls the wires are fed through apertured panels and fair lead bushings 17, also supported by the frame, which bushings direct the wires in a straightened condition to that section of the machine where the cross wires are delivered and welded.

Cross wire feed

Centrally above frame 14 is positioned a cross wire hopper 18 supported at its ends by braces 19 welded or otherwise fastened to the compressor tank 20. Cross wires 21 which have been straightened in a conventional wire-straightening machine, not shown, are loaded into the hopper 18 and roll by gravity along the bottom of the hopper and into the vertical channel 22, best shown in Fig. 3. Below the vertical duct 22 is positioned a transverse rod or shaft 23 upon which are mounted a plurality of notched wheels 24, the shape of the notches of the wheels corresponding to the cross sectional shape of the cross wires, so a cross wire will drop into a notch in the wheels as the notches register with the vertical channel 22. When the wheels are turned by the mat-feeding mechanism cross wires are singly removed from the bottom of the vertical feed channel 22 and are deposited individually through the chute 25 onto the longitudinal wires between the welding electrodes. To position the cross wires accurately on the longitudinal wires there are positioned and supported on frame members 14a a plurality of stops or holding lugs 26, shown in Figs. 3 and 4. As the cross wires are delivered from chute 25 onto the longitudinal wires they are positioned adjacent the lugs and are held in abutment therewith by a plurality of fingers 27 which extend from a shaft 28. At the ends of the shaft are springs, not shown, which exert a rotative tension upon the shaft and fingers and hold each cross wire against lugs 26 as it is deposited upon the longitudinal wires in position for welding. As the mat is advanced after the welding operation has been performed the fingers will be moved with the welded cross wire rotating shaft 28 against its spring tension. When the welded cross wire passes over and releases the fingers they will snap back due to the spring tension on the shaft and engage the next cross wire deposited from the feeding mechanism for welding.

Mat advancing or feeding mechanism

To advance the mat, the operator standing at the side of the machine presses the foot pedal 29 which closes a switch and through conductors 30 actuates a solenoid valve, shown diagrammatically at 31. The valve admits compressed air supplied through pipes 32 from tank 20 below the pistons in double-acting compression cylinders 33 positioned at opposite sides of the machine. This high-pressure air forces the pistons upwardly reciprocating vertical rods 34 which lifts rocker arms 35. The rocker arms are fixedly mounted upon a horizontal shaft 36 enclosed within casing 37. Shaft 36 extends across the width of the frame and is rotatably mounted in bearings 38 supported on the frame. At intervals along the shaft are fixedly attached cranks 39 and at the lower ends of these cranks are pivoted the cross wire hooks or engagement members 40. As the high pressure air is admitted into cylinders 33 below the pistons rocker arms 35 are raised and shaft 36 rotated counterclockwise. Cranks 39 move the cross wire hooks advancing the mat a distance corresponding to the space between the cross wires. The length of each oscillation of the mat-advancing mechanism may be controlled by connecting vertical rod 34 to the rocker arms 35 in any one of the different holes in the rocker arm. This will regulate the length of the rocker arm movement up and down and the travel of the mat engaging hooks. A further and smaller regulation of the rocker arm movement is afforded by the screw thread engagement which rods 34 have with the sleeves 34a of yoke connections which the upper ends of rod 34 make with the rocker arms.

Actuation of the solenoid valve 31 successively introduces compressed air below and above the pistons of cylinders 33 reciprocating the piston upwardly then downwardly. The latter movement lowers the rocker arms and rotates the shaft in the opposite direction causing the cranks to advance the cross wire hooks to engagement with separate sets of cross wires more recently welded. Thus, the feeding mechanism is put in position for further oscillation, which will advance the mat and locate the next deposited cross wire in a position for welding.

It will be noted that a rod or link 41 connects one of the cranks 39 with a crank 42 having ratchet engagement with shaft 23 upon which the cross feed wheels 24 are mounted. The ratchet engagement of arm 42 with shaft 23 is such that with each advancement of the mat the notched wheels 24 are rotated to deliver a cross wire into chute 25. After the cross wire gripping hooks are retracted the direction of movement of link 41 is reversed and due to the ratchet no rotative movement is given to the cross wire feeding wheels.

Electrode actuation device

When a cross wire has been delivered onto the longitudinal wires in a position for welding, as shown in Fig. 3, the operator closes the hand switch 43, shown in Fig. 1. This actuates an electric timing mechanism located within the timer case 45. The details of the timer and the electric circuits involved have been omitted with a view to simplifying the disclosure and recognizing that the timer mechanism forms no part of the invention except in so far as it is an essential to a satisfactory control of the welding operation. In other words, the circuits of the timer are conventional to welding apparatus, the cycles of the timer here employed being adjusted to the particular mat welding operations which are to be performed. Current is supplied to the machine through power lines from a suitable power source to a substation. Transformers at the substation reduce the voltage after which the current is directed to a single coil autotransformer 45a. From the auto-transformer the current passes to ignitron tube contactors and from the contactors it is transmitted to welding transformers. Voltage employed to operate the timer mechanism, the electrode and mat solenoids and motor for the winding apparatus on the carriage is of lower voltage and supplied through separate circuits. Heat regulating switches are located within casing 45b, which control the current to the welding electrodes, and other protective devices essential to good welding practice are employed in the system. In the production of a landing mat in which Imperial 5 gauge steel wire having a diameter of .212 inch was welded, three separate consecutive sequences were automatically performed by the timer with the actuation of the hand switch. During the welding operation the electric energy is cut into the electrodes by the timer circuits from transformers 46 through secondary connections 47. One side of the transformer secondary terminals are connected to the upper electrodes and the other to the lower electrode. The upper electrodes comprise hollow housing members 48 which have flange-shaped terminals 48a. To these terminals are connected the laminated transformer secondary connections. Upper electrodes 49 reciprocate with the housings 48. A cooling medium, such as water is circulated through the electrode housings 48 and electrodes 49 introduced through tubing 50 and discharged through tubing 51. The upper electrodes are connected to and reciprocated by pistons within double-acting pressure cylinders 52. High pressure air is admitted to and discharged from opposite sides of the piston through tubing 53 and 54. The lower welding electrode is a solid cylindrical horn 55 which extends across the width of the mat and is partially jacketed for cooling purposes. Inset in the top of the electrode is a removable and replaceable bar 56, preferably formed of a copper alloy, upon which the wires rest during welding. Transformer connections are made to the bottom electrode by bolting the laminated connections directly to the bottom of the horn.

As previously suggested, when switch 43 is closed the timer is put into operation and proceeds to actuate the welder through its consecutive sequences. During the first period of 18 cycles, the solenoid valve 57 is actuated. This solenoid valve admits high pressure air supplied from tank 20 to enter simultaneously above the pistons of all of the double-acting cylinders. The pistons are lowered and the upper and lower electrodes brought into welding relationship at the intersections of the wires of the mat. As the electrodes squeeze the wires together the second sequence of the timer begins and through a period of 20 cycles the current is passed through the upper and lower electrodes and the welding operation performed. For a period of five cycles thereafter the electrodes are held together with the current shut off. Finally, and during a period of 22 cycles, as a final period of the welding operation, the current remains off and the solenoid valve reverses the flow of high pressure air from above to below the pistons of cylinders 52 whereby the pistons and electrodes are raised. This period is known as the off-time or between-weld period. It should be noted that the four periods of lowering the electrode, the welding cycle, the hold cycle after welding without current passing through the electrodes, and the final off-time cycle or between-weld period are consecutively and manually performed upon closing foot switch 29. In the high pressure air lines are interposed strainers 59, pressure regulators 60 and lubricators 61. Pressure gauges 62 indicate the pressure in the reservoir or pressure tank and in lines which feed the pressure cylinders. High pressure air is fed to cylinders 52 through both ends of a manifold supplied from tank 20 to assure simultaneous operation of the upper electrodes.

*Roll making carriage and reel*

Adjacent the discharge end of the welding apparatus frame is a roll carriage 63 which has upper horizontal frame extensions 64 and lower frame extensions 65 on opposite ends thereof. The carriage and frame members are mounted upon flanged wheels 66 which run on tracks 67. Upright members 68 extend between frames 64 and 65 and to the uprights are bolted horizontal rods 69, shown in Fig. 1. These rods extend through holes in uprights 70 which correspond to the upright 68, but are attached to the frame of the welding apparatus. Coil springs 71 surround rods 69 and are held in compression between the uprights 70 and spring abutments 72 screwed onto threaded portions of the rods 69. Since the springs 71 are under compression they constantly urge the carriage 63 away from the frame of the welding apparatus keeping a constant tension on the mat as it is rolled on a reel or spool 73. Rigidly supported at one end in the upright 70 is a horizontal rod shown in dotted lines in Fig. 1 at 74 and detailed in Fig. 5. At the opposite end of the rod is affixed a lug 75 by means of a set screw 76.

During the welding operation or weld time the circuit to the winding motor 77 is closed and the motor, through chain 78, sprocket 79, chain 80, and meshing gears 81 and 82, rotates the spool or roll 73 to take up the slack on the mat occasioned by the advancement of the mat by the feed mechanism. Horizontal rolls 83 mounted in frame members 84 direct the heat to the roll, keep a constant tension upon the mat and furnish a support for the mat when it is cut from the machine. As the mat is rolled up the tension on the mat produced by the winding motor causes carriage 63 to roll on track 67 toward the welding frame and in so doing compresses springs 71. As these springs are compressed and the carriage draws closer to the frame, lug 75 on rod 74 trips switch arm 85 to the dotted-line position, shown in Fig. 5, against spring tension imposed by coil spring 86. As the switch arm 85 is moved to its dotted-line position the circuit of the winding motor is broken and the motor stops. At this time the coil springs 71 again take effect when the mat is again moved by the feeding mechanism and rolls the carriage 63 away from the welding apparatus frame. The rod 74 is then retracted to the full-line position, shown in Fig. 5, and the winding motor switch moves to its full-line position due to the action of the coil spring 86. Thus, it will be seen that after each winding operation the winding motor automatically starts to take up the slack of the mat when the weld time is on. Likewise, the winding motor is automatically stopped when the mat has been reeled on the roll. At 87 is shown a manually operated switch mechanism which entirely cuts out the winding motor in order that the carriage 63 may be moved and the roll 73 turned in either direction in the event adjustment or repairs are to be made, either in the carriage mechanism or with respect to the feeding mechanism of the mat.

To operate the machine the longitudinal wires are threaded through the straightening rolls and fair lead bushings to extend somewhat beyond the electrodes where a cross wire is fed to lie transversely across the longitudinal wires and held in place by lugs 26 with gripping fingers 27. The operator then actuates the welding mechanism by hand switch 43. The foot pedal through timer 45 first operates the solenoid valve 57 admitting high pressure air from tank 20 through both ends of a manifold to a plurality of double acting pressure cylinders 52 which lower the upper welding heads. When the upper and lower welding heads are in welding position the timer cuts in electric energy from transformers 46 to the welding units and unites the cross wire to the longitudinal wires at their intersections. The timer continues its cycle during which the electric welding circuits are cut, the hand switch is released, and the solenoid valve operated to reverse the piston travel in the cylinders 52 to raise the upper welding heads. The longitudinal wires and welded cross wire must then be advanced to a position where the next cross wire is welded. To do this foot switch 29 is closed which causes solenoid valve 31 to function. This valve introduces high pressure air above the piston in cylinder 33 to lower arm 35 advancing the grasshoppers or cross wire gripping claws 40. The welded cross wire is engaged by the claws and the mat advanced as the solenoid valve reciprocates the piston by introduction of air on the opposite side. The travel of the mat with each reciprocation of the piston is determined by the distance between the cross wires and accurate control of this distance is governed by the regulation afforded by the holes in arm 35 and the threaded engagement which rod 34 has with connecting link 34a.

When enough mat has been welded to reach rolls 83 the mat is fed between the rolls and the leading cross wire hooked onto a series of studs arranged along the periphery of the spool or reel 73. As the mat is fed to the reel, winding motor 77 is automatically started and stopped by actuation of switch 85 through rod 74 synchronized with the mat feeding mechanism to take up the slack of the advancing mat and keeping a constant tension upon the mat as it is fed to reel 73. A suitable counter mechanism connected into the cross wire feed registers the cross wires as they are deposited onto the mat. By means of this counter the operator is kept advised of the length of the mat which is wound on the reel and governs the length of the mat by the number of cross wires.

When a roll has been completed and must be cut from the machine or in case of faulty operation or when repairs are necessary a manual switch 87 instantly cuts out the automatic feed and reel winding motor. Winding of the reel 73 in either direction can then be done from the manual switch as well as the operation of the solenoid which functions the mat feeding mechanism.

Thus, it will be seen that the entire operation of the device is performed from a single station adjacent the foot pedal 29 and hand switch 43. When a completed mat has been rolled onto reel 73 it is cut from the machine, the roll is removed by an overhead crane and an empty reel put in its place. The rolled mat is removed from its reel and wired for shipment.

From the foregoing it will be seen that this invention is well adapted to attain all of the ends and objects set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. An apparatus for welding wire mats made up of a plurality of longitudinal and cross wires welded at their intersections, comprising a frame, straightening means mounted thereon through which the longitudinal wires are fed, cross wire feeding means supported above the frame and adapted to deliver cross wires singly and transversely of the longitudinal wires at spaced intervals, welding electrodes positioned above and below the wires where the cross wires are deposited onto the longitudinal wires, means for bringing the electrodes into welding position, a feeding device for advancing the welding mat and unwelded longitudinal wires subsequent to each welding operation, a roll supported by and rotatable on a movable carriage, power-operated means adapted to rotate the roll and shift the movable carriage said roll and carriage synchronized with the feeding device through said power-operated means to take up the length of the mat advanced by the feeding device and roll it upon the roll.

2. An apparatus as in claim 1 including operable connections between the cross wire feeding means and mat feeding means whereby said separate feeding means coact to deposit a cross wire with each advancement of the mat.

3. An apparatus as in claim 1 in which the feeding device for advancing the mat constitutes a plurality of hook-shaped members positioned between pairs of the longitudinal wires and adapted to engage the cross wires, a transverse shaft located above the mat and rotatably carried on the frame, bell cranks fixedly mounted on the shaft and having said hook-shaped members pivoted to the bell cranks, a double acting compression cylinder supported by the frame, operable connections between the piston of the cylinder and the transverse shaft and a manually operated switch for actuating the compression cylinder piston.

4. An apparatus as in claim 1 wherein stops and spring-actuated fingers are mounted upon and positioned at intervals transversely of the frame, said stops and fingers adapted to hold the cross wires in position on the longitudinal wires during the welding operation.

5. An apparatus as in claim 1 wherein the cross wire feeding means comprises a hopper, a delivery chute between the hopper and frame along which the longitudinal wires are fed, notched feeding wheels rotatably mounted above the frame and intermediate the hopper and delivery chute and operable connections between the feeding wheels and mat-feeding means adapted to deliver cross wires at spaced intervals on the longitudinal wires as they advance along the frame.

JOSEPH A. FOTIE.

REFERENCES CITED

The following references are of record in the file of this patent:

UNITED STATES PATENTS

| Number | Name | Date |
| --- | --- | --- |
| 1,153,384 | Heany | Sept. 14, 1915 |
| 2,033,851 | Roth | Mar. 10, 1936 |
| 2,351,722 | Swenson | June 20, 1944 |
| 633,213 | Perry | Sept. 19, 1899 |